US009967458B2

(12) United States Patent
Kimura et al.

(10) Patent No.: US 9,967,458 B2
(45) Date of Patent: May 8, 2018

(54) CONTROLLING A CLIENT TERMINAL TO AUTOMATICALLY DETERMINE IMAGE SETTINGS

(71) Applicant: SONY CORPORATION, Tokyo (JP)

(72) Inventors: Jun Kimura, Kanagawa (JP);
Tomohisa Tanaka, Tokyo (JP); Osamu Ooba, Tokyo (JP); Ken Miyashita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/478,404

(22) Filed: Apr. 4, 2017

(65) Prior Publication Data

US 2017/0208246 A1     Jul. 20, 2017

Related U.S. Application Data

(63) Continuation of application No. 14/786,472, filed as application No. PCT/JP2014/056188 on Mar. 10, 2014, now Pat. No. 9,635,249.

(30) Foreign Application Priority Data

Apr. 30, 2013   (JP) ................. 2013-095543

(51) Int. Cl.
*H04N 5/222*    (2006.01)
*H04N 5/225*    (2006.01)
(Continued)

(52) U.S. Cl.
CPC ..... *H04N 5/23222* (2013.01); *G06F 17/3028* (2013.01); *H04N 1/00244* (2013.01);
(Continued)

(58) Field of Classification Search
CPC ............ H04N 1/32128; H04N 1/6086; H04N 2201/3252; H04N 1/00132;
(Continued)

(56) References Cited

U.S. PATENT DOCUMENTS 8,027,784 B2      9/2011  Geelen
8,045,343 B2 *   10/2011  Fan ..................... H05K 7/1491
                                                                361/810
(Continued)

FOREIGN PATENT DOCUMENTS

CN       1936685 A      3/2007
CN       101341738 A    1/2009
(Continued)

OTHER PUBLICATIONS

International Search Report and Written Opinion of PCT Application No. PCT/JP2014/056188, dated Apr. 8, 2014, 9 pages of English Translation and 8 pages of ISRWO.
(Continued)

*Primary Examiner* — Trung Diep
(74) *Attorney, Agent, or Firm* — Chip Law Group

(57) ABSTRACT

The client terminal includes a candidate display control unit configured to control a candidate for a reference captured image to be displayed on a display unit, the reference captured image being retrieved based on a preliminary captured image obtained by preliminary image capture in an imaging unit and being referred to during actual image capture, and a detailed information output control unit configured to control detailed information to be output, the detailed information being attached to a reference captured image selected from among the displayed candidates for the reference captured image.

14 Claims, 14 Drawing Sheets

(51) Int. Cl.
*H04N 5/232* (2006.01)
*H04N 5/262* (2006.01)
*H04N 1/00* (2006.01)
*G06F 17/30* (2006.01)

(52) U.S. Cl.
CPC ..... *H04N 1/00251* (2013.01); *H04N 5/23245* (2013.01); *H04N 5/23293* (2013.01); *H04N 5/2628* (2013.01); *H04N 5/23216* (2013.01)

(58) Field of Classification Search
CPC .......... H04N 1/00167; H04N 1/00204; H04N 1/2158; H04N 5/225; H04N 2201/3204; H04N 5/772
See application file for complete search history.

(56) References Cited

U.S. PATENT DOCUMENTS

| | | | |
|---|---|---|---|
| 8,054,343 B2* | 11/2011 | Cheatle | H04N 1/00183 348/14.01 |
| 2001/0048815 A1 | 12/2001 | Nakajima et al. | |
| 2002/0130959 A1* | 9/2002 | McGarvey | H04N 9/735 348/223.1 |
| 2005/0007468 A1 | 1/2005 | Stavely et al. | |
| 2005/0243185 A1* | 11/2005 | Son | H04N 5/23293 348/222.1 |
| 2006/0114336 A1 | 6/2006 | Liu | |
| 2007/0065137 A1 | 3/2007 | Hara et al. | |
| 2007/0171282 A1 | 7/2007 | Yanagi | |
| 2012/0127327 A1 | 5/2012 | You | |
| 2013/0155192 A1* | 6/2013 | Hsiao | H04N 13/0221 348/46 |

FOREIGN PATENT DOCUMENTS

| | | |
|---|---|---|
| HK | 1122447 A | 12/2011 |
| JP | 2007-027945 A | 2/2007 |
| JP | 2007-194819 A | 8/2007 |
| JP | 2007-235508 A | 9/2007 |
| JP | 2008-288882 A | 11/2008 |
| JP | 2009-060339 A | 3/2009 |
| JP | 2009-253669 A | 10/2009 |
| JP | 2009-253717 A | 10/2009 |
| JP | 2010-258765 A | 11/2010 |
| JP | 2011-076427 A | 4/2011 |
| JP | 2012-039591 A | 2/2012 |
| JP | 2012-178666 A | 9/2012 |
| JP | 2013-026955 A | 2/2013 |
| KR | 10-2008-0016631 A | 2/2008 |
| WO | 2007/083818 A1 | 1/2007 |
| WO | 2009/020047 A1 | 2/2009 |

OTHER PUBLICATIONS

International Preliminary Report on Patentability of PCT Application No. PCT/JP2014/056188, dated Nov. 3, 2015, 1 page of English Translation and 5 pages of IPRP.

Office Action for JP Patent Application No. 2015-514772, dated Dec. 26, 2017, 11 pages of Office Action and 10 pages of English Translation.

Office Action for CN Patent Application No. 201480023376.2, dated Jan. 22, 2018, 8 pages of Office Action and 12 pages of English Translation.

* cited by examiner

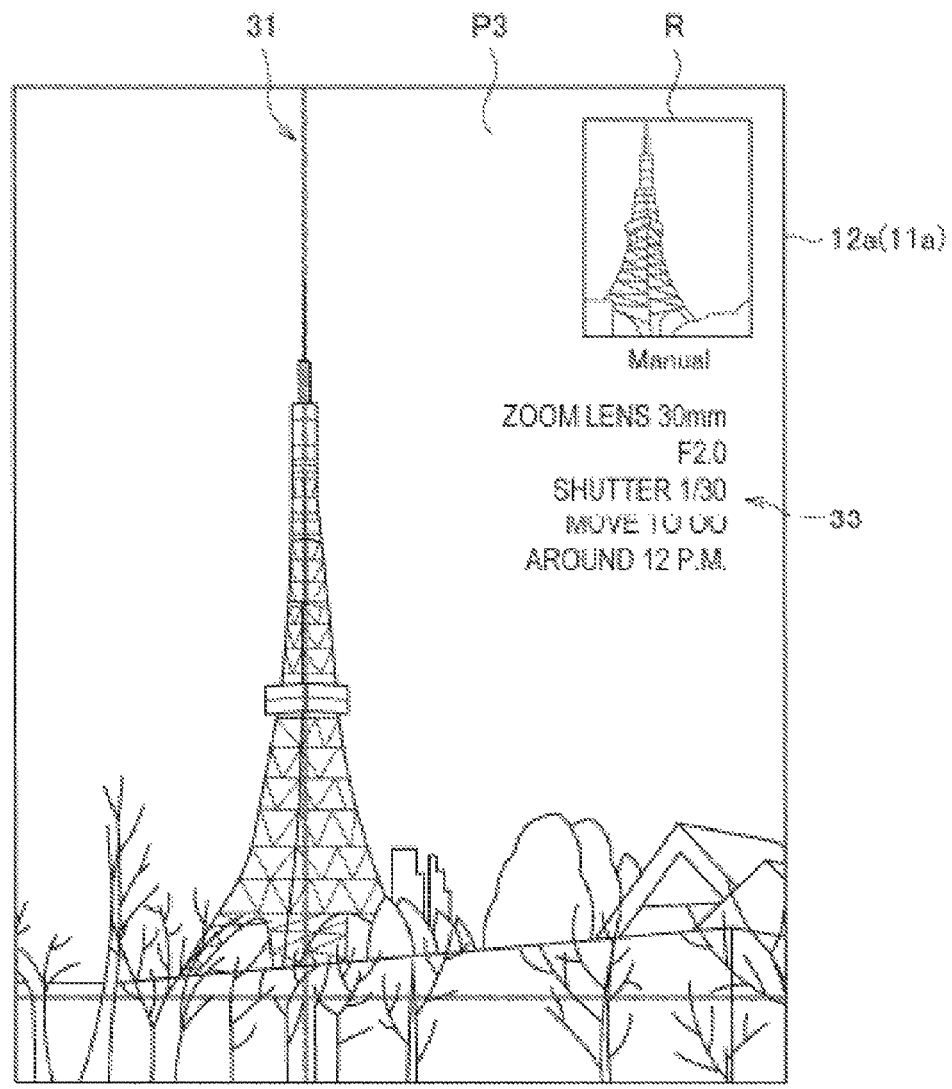

FIG. 9

| | | | |
|---|---|---|---|
| SHOT IMAGE 1 | DETAILED INFORMATION 1 (INFORMATION SUCH AS SHOOTING DATE AND TIME, SHOOTING LOCATION INFORMATION, SHOOTING PARAMETER, HOLDING DIRECTION (ROTATION INFORMATION)) | PHOTOGRAPHIC SUBJECT: TOKYO TOWER | SCORE: N1 |
| SHOT IMAGE 2 | DETAILED INFORMATION 2 (INFORMATION SUCH AS SHOOTING DATE AND TIME, SHOOTING LOCATION INFORMATION, SHOOTING PARAMETER, HOLDING DIRECTION (ROTATION INFORMATION)) | PHOTOGRAPHIC SUBJECT: TOKYO TOWER | SCORE: N2 |
| SHOT IMAGE 3 | DETAILED INFORMATION 3 (INFORMATION SUCH AS SHOOTING DATE AND TIME, SHOOTING LOCATION INFORMATION, SHOOTING PARAMETER, HOLDING DIRECTION (ROTATION INFORMATION)) | PHOTOGRAPHIC SUBJECT: TOKYO TOWER | SCORE: N3 |
| SHOT IMAGE 4 | DETAILED INFORMATION 4 (INFORMATION SUCH AS SHOOTING DATE AND TIME, SHOOTING LOCATION INFORMATION, SHOOTING PARAMETER, HOLDING DIRECTION (ROTATION INFORMATION)) | PHOTOGRAPHIC SUBJECT: TOKYO TOWER | SCORE: N4 |

231

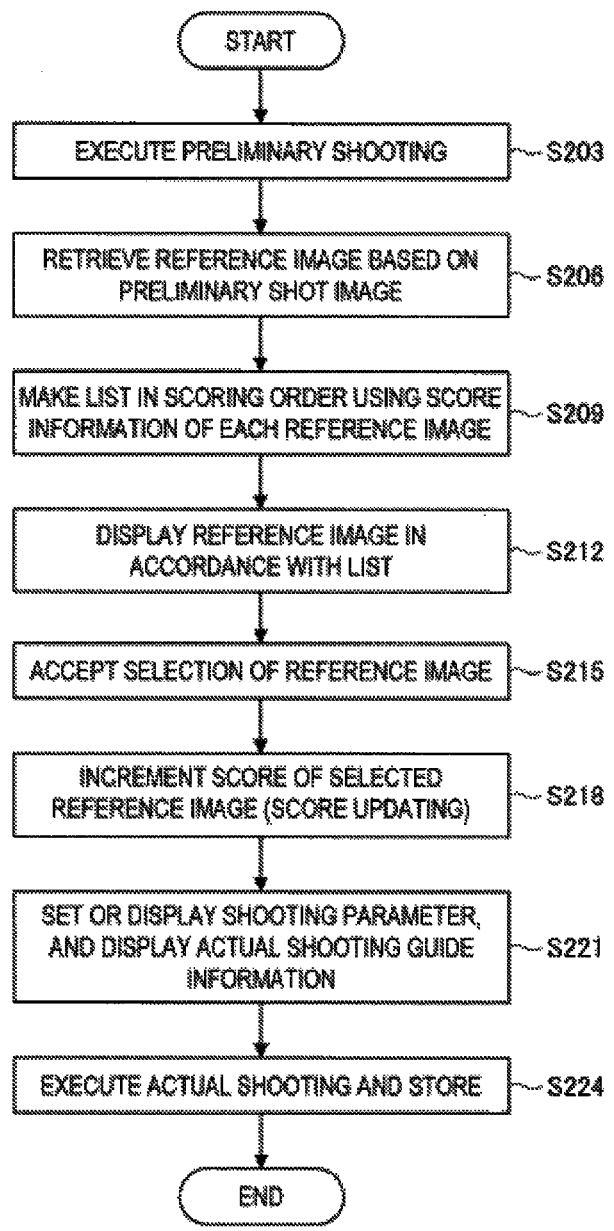

CONTROLLING A CLIENT TERMINAL TO AUTOMATICALLY DETERMINE IMAGE SETTINGS

CROSS REFERENCE TO RELATED APPLICATIONS

The present application is a continuation application of U.S. patent application Ser. No. 14/786,472, filed Oct. 22, 2015, which is a national stage entry of PCT application PCT/JP2014/056188 filed Mar. 10, 2014 and which claims the benefit of Japanese Priority Patent Application 2013-095543 filed Apr. 30, 2013, the entire contents of which are incorporated herein by reference.

TECHNICAL FIELD

The present disclosure relates to a client terminal, a display control method, a program, and a system.

BACKGROUND

In general, when a photograph is taken with a digital camera, the user selects any of a plurality of shooting scenes (e.g., portrait, night scene, sunset, and sport), and then settings (e.g., shutter speed, aperture adjustment, and existence of electronic flash) corresponding to each scene are automatically enabled. However, the user still manually selects a shooting scene.

A photograph taken has various parameters stored therein as EXIF information at the time of shooting, but there is no information stored regarding the user's operation used when the photograph is taken. Thus, only the EXIF information can be used to know a way of shooting the photograph that has been taken by other people. In this regard, techniques that support photographic shooting are reported as follows below.

For example, Patent Literature 1 discloses an imaging device capable of automatically determining its imaging magnification and easily photographing an image with a desired composition when a photographic subject is taken in the composition that contains a particular region of the photographic subject.

Patent Literature 2 discloses a technique that allows a person's face to be photographed finely depending on the state of the face without missing a chance to shoot a photograph.

Patent Literature 3 discloses a technique that shares a shot image between a plurality of users over a network to build a community where a relationship is actually established.

CITATION LIST

Patent Literature

Patent Literature 1: JP 2012-039591A
Patent Literature 2: JP 2012-178666A
Patent Literature 3: JP 2011-076427A

SUMMARY OF INVENTION

Technical Problem

None of Patent Literatures described above have suggested that a screen used to select an image to be captured from among reference image candidates is displayed during image capture.

Therefore, according to the present disclosure, there is provided a novel and improved client terminal, display control method, program, and system capable of supporting the user's actual image capture using a reference image based on preliminary image capture.

Solution to Problem

According to the present disclosure, there is provided a client terminal including: a candidate display control unit configured to control a candidate for a reference captured image to be displayed on a display unit, the reference captured image being retrieved based on a preliminary captured image obtained by preliminary image capture in an imaging unit and being referred to during actual image capture; and a detailed information output control unit configured to control detailed information to be output, the detailed information being attached to a reference captured image selected from among the displayed candidates for the reference captured image.

According to the present disclosure, there is provided a display control method including: a step of controlling a candidate for a reference captured image to be displayed on a display unit, the reference captured image being retrieved based on a preliminary captured image obtained by preliminary image capture in an imaging unit and being referred to during actual image capture; and a step of controlling detailed information to be output, the detailed information being attached to a reference captured image selected from among the displayed candidates for the reference captured image.

According to the present disclosure, there is provided a program for causing a computer to execute: processing of controlling a candidate for a reference captured image to be displayed on a display unit, the reference captured image being retrieved based on a preliminary captured image obtained by preliminary image capture in an imaging unit and being referred to during actual image capture; and processing of controlling detailed information to be output, the detailed information being attached to a reference captured image selected from among the displayed candidates for the reference captured image.

According to the present disclosure, there is provided a system including: a client terminal including a transmitter configured to transmit a preliminary captured image obtained by preliminary image capture to a server, a receiver configured to receives a candidate for a reference captured image from the server, the reference captured image being retrieved based on the preliminary captured image obtained by preliminary image capture, a candidate display control unit configured to control the candidate for the reference captured image received by the receiver to be displayed on a display unit, and a detailed information output control unit configured to control detailed information to be output, the detailed information being attached to a reference captured image selected from among the displayed candidates for the reference captured image; and a server including a storage unit configured to store the reference captured image, a retrieval unit configured to retrieve a candidate for a reference captured image from the storage unit based on the preliminary captured image transmitted from the client terminal, and a transmitter configured to transmit a candidate for a reference captured image retrieved by the retrieval unit to the client terminal.

Advantageous Effects of Invention

According to the present disclosure as described above, it is possible to support the user's actual image capture using a reference image based on preliminary image capture.

BRIEF DESCRIPTION OF DRAWINGS

FIG. 7A is a diagram illustrating an example of displaying guide information in manual mode.

FIG. 9 is a diagram illustrated to describe a configuration example of data stored in a storage unit according to the present embodiment.

FIG. 13 is a flowchart illustrating a shooting support process according to another embodiment of the present disclosure.

DESCRIPTION OF EMBODIMENTS

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

The description is given in the following order.
1. Overview of Shooting Support System according to Embodiment of Present Disclosure
2. General Configuration
2-1. Configuration of Digital Camera
2-2. Configuration of Server
3. Operation Processing
4. Other Embodiments
5. Conclusion

1. OVERVIEW OF SHOOTING SUPPORT SYSTEM ACCORDING TO EMBODIMENT OF PRESENT DISCLOSURE

An overview of a shooting support system according to an embodiment of the present disclosure will be described with reference to FIG. 1.

Figure 1:
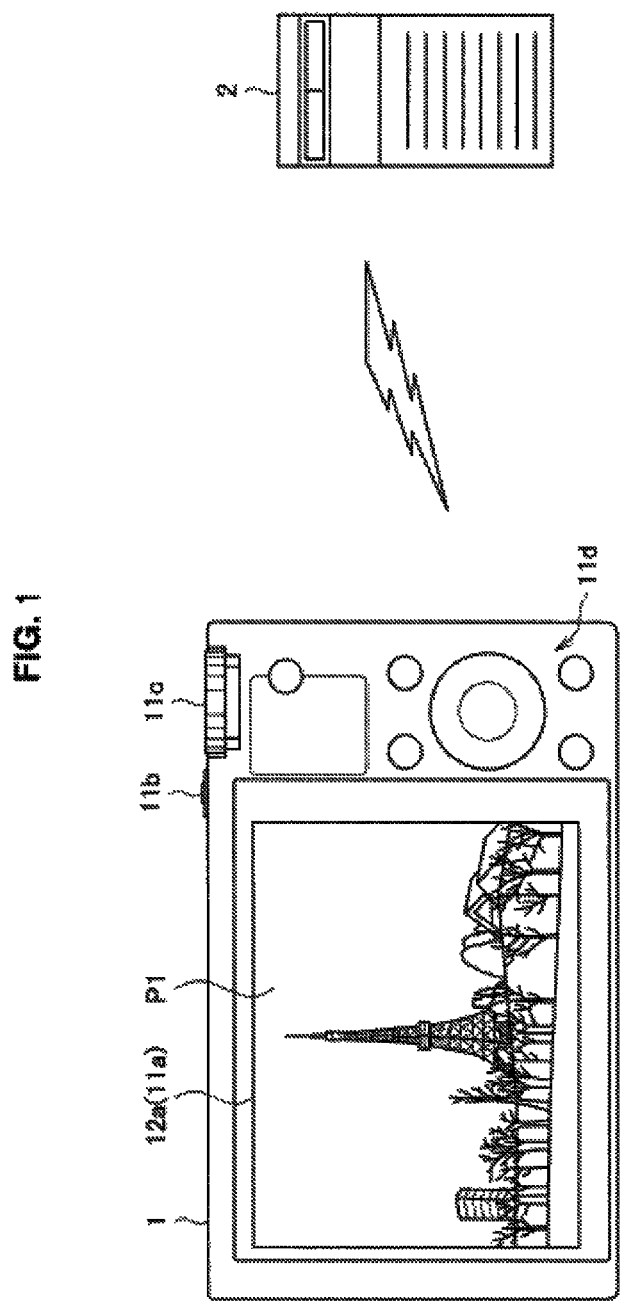
FIG. 1 is a diagram illustrated to describe an overview of a shooting support system according to an embodiment of the present disclosure.

FIG. 1 is a diagram illustrated to describe an overview of a shooting support system according to an embodiment of the present disclosure. As shown in FIG. 1, a shooting support system according to the present embodiment is configured to include a digital camera 1 (client terminal) and a server 2 which are connected to each other wirelessly or wired to perform data transmission and reception. Specifically, the digital camera 1 is connected to a network using wireless communication such as local area network and Wi-Fi (registered trademark), or wired communication, and transmits and receives data to and from the server 2 on the network.

The server 2 according to the present disclosure manages a shot image that is taken by the user or other people. The server 2 can transmit a given shot image to the digital camera 1 in response to a request from the digital camera 1 and can receive a shot image that is photographed with the digital camera 1 from the digital camera 1.

The digital camera 1, as shown in FIG. 1, includes a display unit 12a (an example of an output device 12) provided on one surface of a housing that forms the exterior of the digital camera 1. The digital camera 1 includes an imaging lens or an electronic flash provided on a surface (not shown) opposite to the surface on which the display unit 12a is provided. The display unit 12a may be a touch panel display that includes a touch sensor 11a (an example of an input device 11) stacked thereon, and the user's operation on a display surface of the display unit 12a is detected.

The digital camera includes a shutter button 11b, a zoom lever 11c, and a power ON/OFF button (not shown) provided on a top surface thereof.

As shown in FIG. 1, various operation buttons 11d, such as menu button, playback button, enter button, delete button, and mode switching button, are provided next to the display unit 12a. The mode switching button is a button used to perform switching between shooting modes, such as manual shooting mode, auto shooting mode, panorama shooting mode, and video shooting mode. The playback button is a button used to reproduce a captured image, which is stored in the digital camera 1, on the display unit 12a.

The user, when turning on the power of the digital camera 1, sets the camera's shooting mode to a predetermined shooting mode and directs the digital camera 1 (specifically, an imaging lens of the camera) toward a photographic subject (e.g., Tokyo Tower). The digital camera 1 displays a through-the-lens image P1 on the display unit 12a in a continuous manner (in real time). The through-the-lens image P1 is digital data of photographic subject images that are sequentially captured by condensing light using an imaging lens and receiving it using an image sensor such as CCD. The user can check the state of framing and perform a shooting operation while viewing the through-the-lens image P1 displayed on the display unit 12a as describe above.

When the user selects any one of a plurality of shooting scenes (e.g., portrait, night scene, sunset, and sport) in the auto shooting mode, it is typical that setting corresponding to the selected scene (e.g., shutter speed, shutter speed, aperture adjustment, and existence of electronic flash) is automatically performed.

However, the user manually selects a shooting scene and the setting corresponding to each shooting scene is performed automatically, thus the user may not necessarily shoot a scene with hue or atmosphere that the user wants to photograph. In manual shooting mode, the user can perform various settings related to shooting as desired, but the user who has little or no professional knowledge related to shooting is difficult to appropriately decide what type of setting is necessary to shoot a desired scene.

In view of the above circumstances, the shooting support system according to the present disclosure can support the user's actual shooting by displaying a reference captured image retrieved based on the preliminary shooting (hereinafter, referred to also as "reference image") and displaying detailed information of a selected reference image or automatically setting a shooting parameter contained in the detailed information. The user can use a captured image that is actually captured as a reference to specifically indicate a scene to be photographed. The detailed information related to the captured image as a reference, such as shooting parameter and shooting location or shooting date and time, is output, and thus the user can check the detailed information of an image to be photographed and perform effectively a shooting operation that is similar to the reference image.

The reference image as a candidate may be an image captured by other user. The image captured by other user may be retrieved by the server 2 and transmitted from the server 2, based on the image obtained through the preliminary shooting in the digital camera 1. This allows the user to shoot a photograph while the user feels a sense of community and fellowship.

The overview of the shooting support system according to an embodiment of the present disclosure has been described above. The configuration of the digital camera 1 (client terminal) and the server 2 which are included in the shooting support system according to the present embodiment will be described in detail with reference to FIGS. 2 to 9.

In the example shown in FIG. 1, although the digital camera 1 is illustrated as one example of the client terminal according to the present embodiment, the client terminal according to the present embodiment is not limited thereto. Examples of the client terminal may include, but is not limited to, digital video cameras, mobile phones having an imaging function, personal handy-phone systems (PHS), smartphones, personal digital assistants (PDA), head-mounted displays (HMD), optical see-through HMDs (eye-glass-type HMD), and notebook PCs.

2. GENERAL CONFIGURATION

<2-1. Configuration of Digital Camera>

Figure 2:
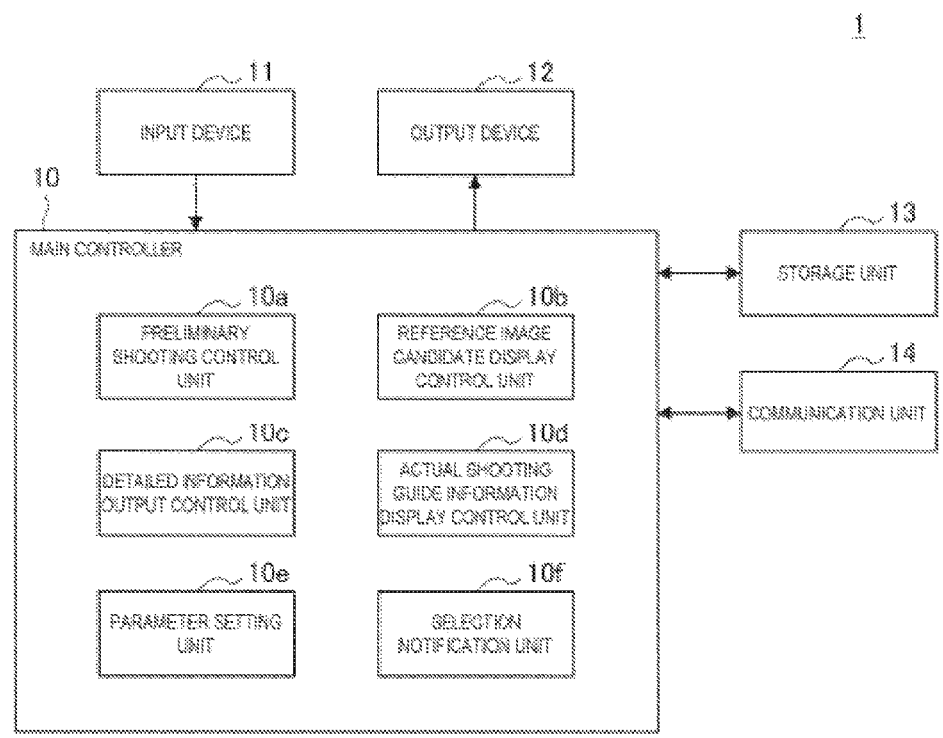
FIG. 2 is a block diagram illustrating an internal configuration example of a digital camera according to the present embodiment.

FIG. 2 is a block diagram illustrating an internal configuration example of the digital camera 1 according to the present embodiment. As shown in FIG. 2, the digital camera 1 according to the present embodiment is configured to include a main controller 10, an input device 11, an output device 12, a storage unit 13, and a communication unit 14.

(Input Device)

The input device 11 is a device used to input information to the digital camera 1. Specifically, the input device 11 is implemented as a device used to input the user's operation, including a touch sensor 11a, a shutter button 11b, a zoom lever 11c, and various operation buttons 11d. The touch sensor 11a is stacked on the display unit 12a. The shutter button 11b, the zoom lever 11c, and the operation buttons 11d are provided on the top surface of the digital camera 1.

The input device 11 may be implemented as a device including an imaging optical system having an imaging lens, an image sensor, and an imaging module having an image signal processor. The image sensor may be implemented as a charge-coupled device (CCD) imager or a complementary metal-oxide-semiconductor (CMOS) imager. The image signal processor may be used to perform noise reduction, gradation correction, color correction, distortion correction, blurring correction, compression/decompression of image, and so on. The image processor also performs a feature quantity detection process, and supplies an image and feature quantity data of the image to the main controller 10.

The input device 11 may be implemented as a device including a microphone and an audio signal processor. The microphone and the audio signal processor allow the user's voice to be input.

The input device 11 supplies the input information to the main controller 10.

(Output Device)

The output device 12 is a device used to reproduce information output to the user from the digital camera 1. Specifically, the output device 12 is implemented as the display unit 12a, a loudspeaker (not shown), or the like. The display unit 12a is implemented, for example, as a liquid crystal display (LCD) or an organic light-emitting diode (OLED).

(Main Controller)

The main controller 10 controls components in the digital camera 1. The main controller 10 is implemented, for example, as a microprocessor. The main controller 10 according to the present embodiment functions as a preliminary shooting control unit 10a, a reference image candidate display control unit 10b, a detailed information output control unit 10c, an actual shooting guide information display control unit 10d, a parameter setting unit 10e, and a selection notification unit 10f, as shown in FIG. 2.

Preliminary Shooting Control Unit

The preliminary shooting control unit 10a performs a preliminary shooting (shooting for preview) of a photographic subject using the imaging module of the input device 11. The preliminary shooting of a photographic subject is performed in the state where the imaging lens faces a photographic subject to be captured by the user and the photographic subject is contained in the through-the-lens image P1 (preview screen) displayed on the display unit 12a. In this case, the user can only place the photographic subject to be contained in the through-the-lens image (to be in the range of angle of view) without being especially aware of its composition and angle.

The preliminary shooting may be performed when the user's preliminary shooting instruction on the input device 11 is input. Specifically, the preliminary shooting is performed, for example, when the shutter button 11b is pressed, when the touch sensor 11a detects a contact on a photographic subject contained in the through-the-lens image, and when the preliminary shooting is instructed by a voice input through a microphone. Pressing the shutter button 11b is used as a trigger when actual shooting described later is performed. Thus, to distinguish the preliminary shooting from actual shooting, for example, a first press of the shutter button 11b may be set as the preliminary shooting, or the half-push/press-and-hold of the shutter button 11b may be set as the preliminary shooting.

The instruction to perform the preliminary shooting may include an implicit instruction to perform the preliminary shooting by recognizing that the user is interested in a subject to be photographed, in addition to the explicit instruction to perform the preliminary shooting by the user. An example of the implicit instruction to perform the preliminary shooting includes a case where the through-the-lens image P1 is suspended for a predetermined time (a case where there is no movement for a given time while a photographic subject is being contained in the through-the-lens image). In this case, the preliminary shooting control unit 10a recognizes that the user is interested in a photographic subject contained in the through-the-lens image P1 and accordingly performs the preliminary shooting. When the digital camera 1 is provided with a front-facing camera (a camera provided to face the user acting as a photographer), the main controller 10 can detect the direction of the user's line of sight by the front-facing camera. When the user's line of sight is looking at a particular photographic subject within the through-the-lens image for a predetermined time based on the detected direction of the user's line of sight, the preliminary shooting control unit 10a recognizes that the user is interested in the photographic subject and performs the preliminary shooting. The digital camera 1 may be provided with a viewfinder having a function of detecting the user's line of sight, in addition to such a front-facing camera. In this case, when the user's line of sight is looking at a particular photographic subject within the through-the-lens image for a predetermined time based on the direction of the user's line of sight detected by the viewfinder, the preliminary shooting control unit 10a recognizes that the user is interested in the photographic subject and can perform the preliminary shooting. In this way, when it is indicated that the user is interested in a particular photographic subject based on a fact that an imaging lens remains stationary while facing the photographic subject or a fact that the user looks at the photographic subject contained in the through-the-lens image for a predetermined time, the preliminary shooting control unit 10a allows the preliminary shooting to be performed.

The preliminary shooting control unit 10a controls a preliminary shot image obtained through the preliminary shooting to be transmitted to the server 2 via the communication unit 14 together with the feature quantity (color or shape of a photographic subject) detected from the image obtained through preliminary shooting by the image signal processor.

Reference Image Candidate Display Control Unit

The reference image candidate display control unit 10b controls a reference image candidate (a candidate for a reference captured image) transmitted from the server 2 via the communication unit 14 to be displayed on the display unit 12a. The server 2 retrieves a shot image obtained by photographing the same or similar photographic subject, based on the preliminary shot image and feature quantity data transmitted from the digital camera 1, and transmits the retrieved shot image as a reference image candidate to the digital camera 1, which will be described in detail later. For example, when the through-the-lens image P1 shown in FIG. 1 is obtained through the preliminary shooting (hereinafter, referred to as "preliminary shot image P1"), the server 2 retrieves a captured image obtained by capturing the same "Tokyo Tower" or a captured image obtained by capturing a similar other towers (e.g., the Eiffel Tower and Tokyo Skytree) based on the feature quantity data of the photographic subject "Tokyo Tower" contained in the preliminary shot image P1. The captured image to be retrieved may be an image captured previously by the user or may be an image captured by other users. The server 2 transmits the captured image retrieved in this way to the digital camera 1 as a reference image candidate. The server 2 may form a list of the reference image candidates to be transmitted in the order of obtained scores based on scores and then may transmit listed candidates. This allows the reference image candidate display control unit 10b to display a captured image, which is obtained by capturing a subject being photographed by the user or a similar photographic subject, on the display unit 12a as a reference image candidate.

Selection of any of the displayed reference image candidates may be performed by pressing the enter button or assist button of the various operation buttons 11d, performing a touch operation (or long tap operation/double tap operation) on the reference image candidate detected by the touch sensor 11a, or inputting a voice through a microphone (not shown). Alternatively, Selection of any of the displayed reference image candidates may be performed by inputting the line of sight using a front-facing camera.

A method of displaying a reference image candidate by the reference image candidate display control unit 10b is not limited to a particular method. For example, a display method that will be described later with reference to FIGS. 3 and 4 may be used.

Figure 3:
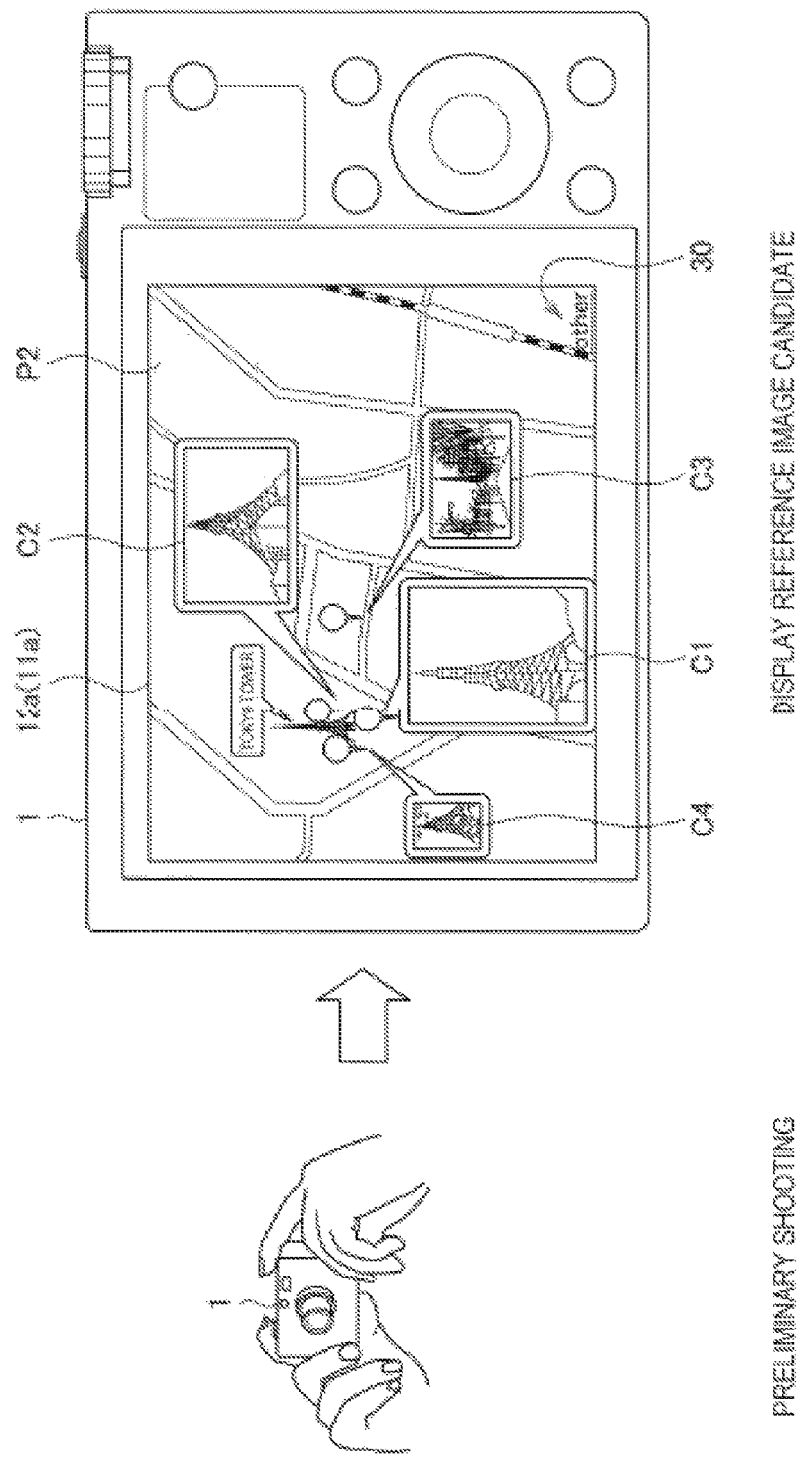
FIG. 3 is a diagram illustrated to describe an example of a method of displaying a reference image candidate according to the present embodiment.

FIG. 3 is a diagram illustrated to describe an example of a method of displaying a reference image candidate according to the present embodiment. As shown on the left part of FIG. 3, when the user performs the preliminary shooting with the digital camera 1 facing a photographic subject, reference image candidates C1, C2, C3, and C4 are overlaid on a map image P2 displayed on the display unit 12a of the digital camera 1, as shown on the right part of FIG. 3. Specifically, the reference image candidate display control unit 10b displays landmark icons indicating the shooting location of each of the reference image candidates C1 to C4 transmitted from the server 2 on the map image P2, and displays the reference image candidates C1 to C4 in association with the corresponding landmark icons.

The reference image candidate display control unit 10b may display a reference image in order of its ranking. Specifically, reference images may be displayed in the order of ranking in the reference image list, which is transmitted from the server 2 and arranged in the order of scores based on score information, or the ranking list based on the score information attached to each of the reference image. In the example illustrated in FIG. 3, the obtained scores are arranged in the order of reference image candidates C1, C2, C3, and C4, and thus the size of the respective images becomes smaller in the order of reference image candidates C1, C2, C3, and C4, as shown in FIG. 3.

The screen having such reference image candidates displayed thereon may be generated by the server 2 and transmitted from the server 2. Alternatively, the reference image candidate display control unit 10b may generate the reference image candidates so that they are controlled to be displayed on the map image P2 based on the shooting location and score information attached to each of the reference image candidates C1 to C4.

The user selects a captured image having a composition, an angle, an effect, and a hue to be photographed from among the reference image candidates C1 to C4 (e.g., it is selected using a touch operation). In this way, displaying a captured image actually captured by the user or other users allows the user to form a clear idea of a captured image to be photographed and to specify the desired composition, angle, or the like in detail. In the example shown in FIG. 3, although four reference image candidates C1 to C4 are displayed, when an indication 30 presented by "other" on the lower right of the display unit 12a is selected, other reference image candidates (e.g., candidates being ranked fifth or lower) are displayed.

The reference image candidates C1 to C4 are displayed in different size in accordance with their scores, and thus the user can intuitively recognize a popular reference image.

Furthermore, a landmark icon indicating a shooting location of each of the reference image candidates C1 to C4 is displayed on the map image P2, and thus the user can intuitively recognize a place to be moved to obtain a captured image similar to the desired reference image candidate. When the digital camera 1 is provided with the global positioning system (GPS) positioning device, the reference image candidate display control unit 10b can also display a current position icon that indicates the current position of the user on the map image P2. This allows the user to intuitively recognize a positional relationship between the current position and the shooting location of each of the reference image candidates C1 to C4.

Figure 4:
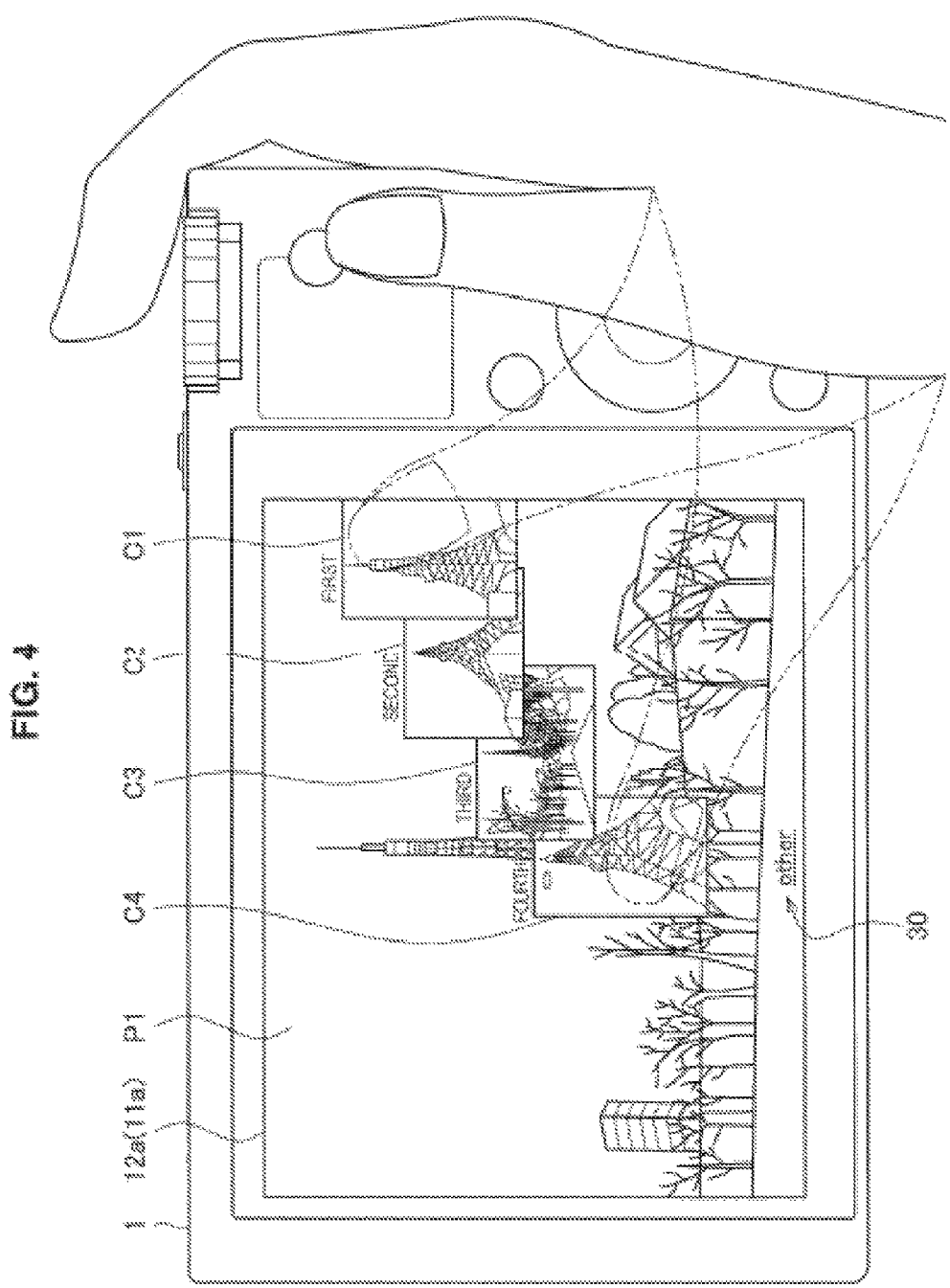
FIG. 4 is a diagram illustrated to describe another example of a method of displaying a reference image candidate according to the present embodiment.

FIG. 4 is a diagram illustrated to describe another example of a method of displaying a reference image candidate according to the present embodiment. As shown in FIG. 4, the preliminary shot image P1 (a through-the-lens image) is displayed on the display unit 12a of the digital camera 1, and the reference image candidates C1 to C4 are displayed on the preliminary shot image (a through-the-lens image) P1. As shown in FIG. 4 for example, when a grip portion (a right end portion) of the digital camera 1 is hold with the right hand, the reference image candidates C1 to C4 are all displayed within the movable range in the case of moving the thumb while holding the digital camera 1. The reference image candidate display control unit 10b displays a reference image candidate having a higher score (higher ranking) at a position close to the thumb, and thus it is possible for the user to easily select a reference image candidate having a higher ranking.

The reference image candidate display control unit 10b can display the ranking order corresponding to each of the reference image candidates C1 to C4 near each of the reference image candidates, as shown in FIG. 4.

In the example shown in FIG. 4, although only four reference image candidates C1 to C1 are displayed, when an indication 30 presented by "other" below the display unit 12a is selected, other reference image candidates (e.g., candidates being ranked fifth or lower) are displayed.

The reference image candidate display control unit 10b has been described above in detail.

Detailed Information Output Control Unit

The detailed information output control unit 10c controls the detailed information to be displayed on the display unit 12a or to be output as a voice from a loudspeaker (not shown). The detailed information is attached to a reference image candidate that is selected from among the reference image candidates displayed on the display unit 12a. Examples of detailed information as used herein include shooting parameter (camera setting information), shooting location (position) information, shooting date and time information, rotation information, model information, and score information.

The detailed information output control unit 10c may output the detailed information attached to a reference image candidate that is selected from among the reference image candidates displayed on the display unit 12a in the state before switching to the actual shooting, or may output the detailed information in the state after switching to the actual shooting.

Figure 5:
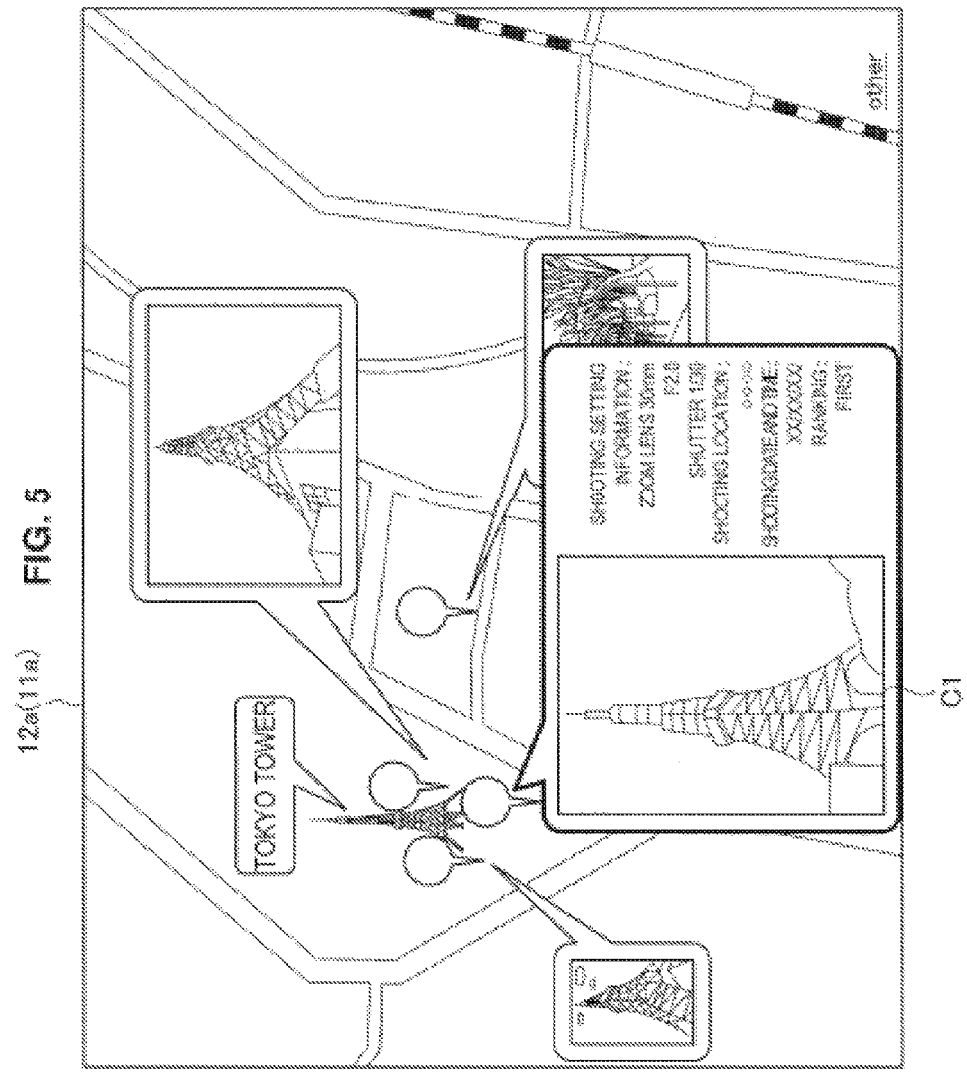
FIG. 5 is a diagram illustrated to describe a case of outputting detailed information in a state before switching to actual shooting.

As an example, a case of outputting the detailed information in the state before switching to the actual shooting will be described with reference to FIG. 5. For example, when the reference image candidate C1 displayed on the display unit 12a is touched, the user's selection operation is detected by the touch sensor 11a, and the detailed information output control unit 10c displays detailed information of the reference image candidate C1 (shooting setting information, shooting location and date/time information, ranking information) as shown in FIG. 5. This allows the user to recognize detailed information of a captured image to be photographed. When an operation is performed to confirm selection of the reference image candidate C1, the main controller 10 switches the shooting mode to the actual shooting mode. The operation of confirming selection of the reference image candidate C1 may correspond to, for example, a long tap or double tap on the region in which the reference image candidate C1 is displayed, or a depression of the enter button among the various operation buttons 11d.

Outputting the detailed information in the state after switching to the actual shooting will be described later with reference to FIGS. 7A and 7B.

Actual Shooting Guide Information Display Control Unit

When a reference image candidate is selected from among the reference image candidates displayed on the display unit 12a and the shooting mode is switched to the actual shooting mode, the actual shooting guide information display control unit 10d controls shooting assist information corresponding to the selected reference image to be displayed. The shooting assist information may be guide information used to guide the composition or angle of the actual shooting based on a result obtained by analyzing the reference image or detailed information attached to the reference information.

For example, when the detailed information attached to the reference image contains rotation information, the actual shooting guide information display control unit 10d allows the user to know whether the reference image is shot in the lateral direction or in the longitudinal direction based on the rotation information. As an example, when the reference image is shot in the longitudinal direction, the actual shooting guide information display control unit 10d displays a thumbnail of the reference image on a preview screen (through-the-lens image) for the actual shooting in the lateral direction, and thus the user is guided to move the digital camera 1 in the lateral direction.

The actual shooting guide information display control unit 10d displays an auxiliary line used to achieve the composition or angle that is similar to that of the reference image on the preview screen (through-the-lens image) for actual shooting depending on a result obtained by analyzing the reference image, thereby guiding the user's shooting operation (adjustment of zoom or image capturing direction).

In this way, a guiding mark used to perform a shooting with the composition or at the angle, which is similar to that of the reference image, is displayed, and thus it is possible for the user to shoot effectively an image to be photographed. A specific example of displaying shooting assist information will be described later with reference to FIGS. 6 and 7.

Parameter Setting Unit

When a reference image candidate is selected from among the reference image candidates displayed on the display unit 12a and the shooting mode is switched to the actual shooting mode, the parameter setting unit 10e controls a shooting parameter similar to the selected reference image to be set automatically. Examples of the shooting parameter include aperture adjustment (f-number), shutter speed, ISO sensitivity, white balance, existence of electronic flash. This allows the user to shoot effectively an image to be photographed without any trouble of setting by the user.

The parameter setting unit 10e according to the present embodiment may set a shooting parameter in auto mode and may not set a shooting mode in manual mode. An example of displaying a shooting parameter and guide information during the actual shooting will be described in detail with reference to FIGS. 6 and 7.

Figure 6:
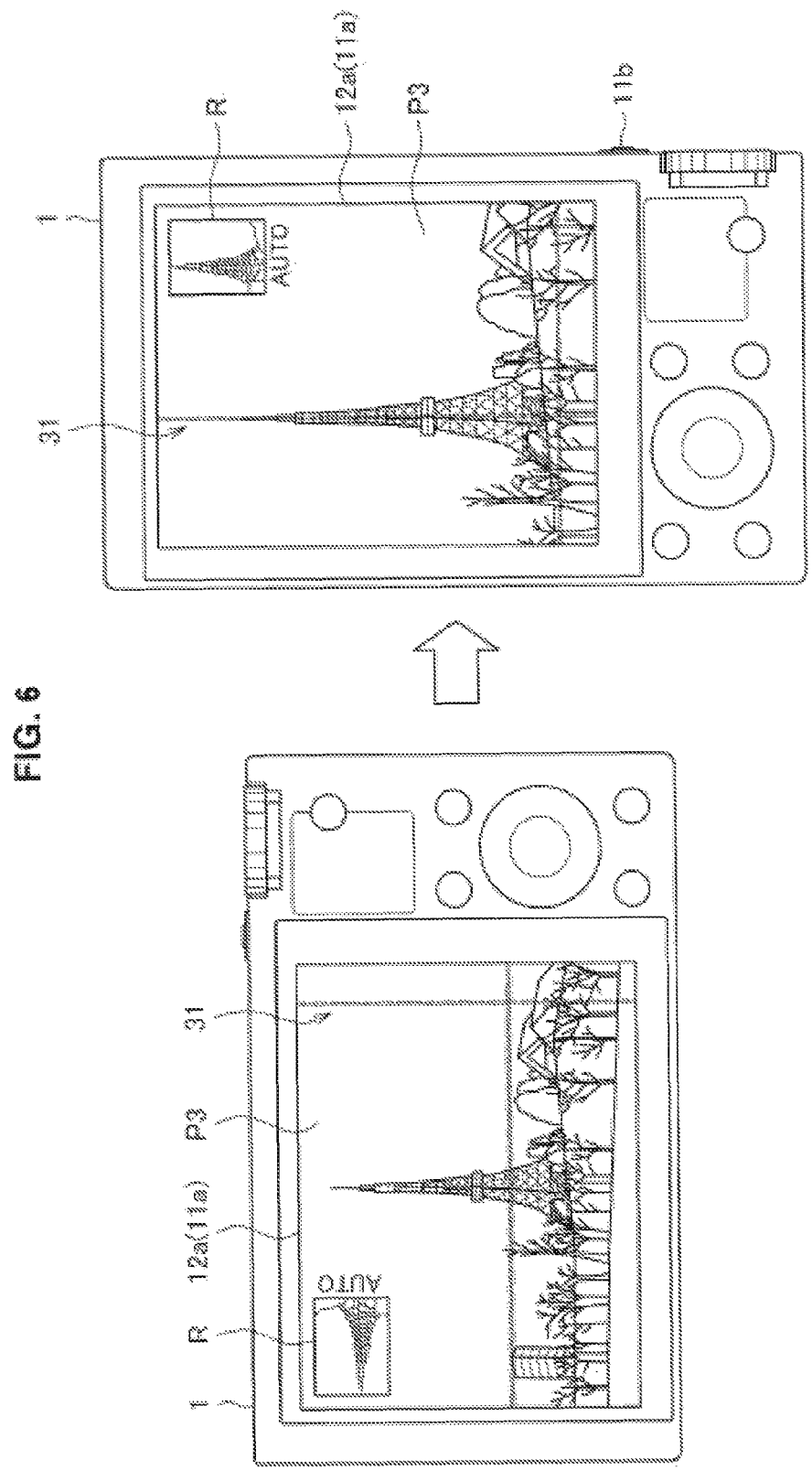
FIG. 6 is a diagram illustrating an example of displaying guide information in auto mode.

FIG. 6 is a diagram illustrating an example of displaying guide information in auto mode. In the example shown in FIG. 6, the reference image candidate C1 is selected from among the reference image candidates C1 to C4 described above with reference to FIGS. 3 and 4, and a display screen example in the state after switching to the actual shooting mode is illustrated.

As shown in the left part of FIG. 6, a preview screen (through-the-lens image P3) for the actual shooting, which is successively captured by the imaging lens, is displayed on the display unit 12*a* of the digital camera 1 in real time. The actual shooting guide information display control unit 10*d* according to the present embodiment displays a reference image R, which is a thumbnail of the reference image candidate C1, on the preview screen (through-the-lens image P3) for the actual shooting in the longitudinal direction depending on rotation information (90 degree rotation/longitudinal direction) of the reference image candidate C1. The actual shooting guide information display control unit 10*d* displays an auxiliary line 31 used to achieve the composition similar to that of the reference image candidate C1 on the preview screen (through-the-lens image P3) for the actual shooting based on a result obtained by analyzing the reference image candidate C1.

Thus, the user can rotate the digital camera 1 to be the longitudinal direction as shown in the right part of FIG. 6 and can change the shooting direction to move the digital camera 1 so that a photographic subject is overlapped on the auxiliary line 31. This allows the user to achieve the composition or direction (rotation direction) similar to that of the reference image R.

The parameter setting unit 10*e* sets a similar shooting parameter based on the shooting parameter attached to the reference image candidate C1. In the auto mode of the example shown in FIG. 6, the shooting parameter is automatically set by the parameter setting unit 10*e*. Thus, the detailed information output control unit 10*c* does not display detailed information (including shooting parameters).

In this way, it is possible for the user to effectively shoot an image similar to the reference image R that is an image to be photographed by moving the digital camera 1 along the direction of the reference image R or the auxiliary line 31 without any trouble of setting of shooting parameters.

An example of displaying guide information in manual mode will be described with reference to FIGS. 7A and 7B. FIGS. 7A and 7B are diagrams illustrating an example of displaying guide information in manual mode. In the example shown in FIGS. 7A and 7B, the reference image candidate C1 is selected from among the reference image candidates C1 to C4 described above with reference to FIGS. 3 and 4, and a display screen example in the state after switching to the actual shooting mode is illustrated.

As shown in FIG. 7A, a preview screen (through-the-lens image P3) for the actual shooting, which is successively captured by the imaging lens, is displayed on the display unit 12*a* of the digital camera 1 in real time, as is the case in FIG. 6. The actual shooting guide information display control unit 10*d* displays a reference image R, which is a thumbnail of the reference image candidate C1, on the preview screen (through-the-lens image P3) for the actual shooting in the longitudinal direction depending on rotation information of the reference image candidate C1, as is the case in FIG. 6. The actual shooting guide information display control unit 10*d* displays an auxiliary line 31 used to achieve the composition similar to that of the reference image candidate C1 on the preview screen (through-the-lens image P3) for the actual shooting based on a result obtained by analyzing the reference image candidate C1. Thus, the user can rotate the digital camera 1 to be the longitudinal direction as shown in the right portion of FIG. 6 and can change the shooting direction to move the digital camera 1 so that a photographic subject is overlapped on the auxiliary line 31. This allows the user to achieve the composition or direction (rotation direction) similar to that of the reference image R.

The detailed information output control unit 10*c* displays detailed information 33 attached to the reference image candidate C1 (reference image R), as shown in FIG. 7A. The detailed information 33 may contain a shooting parameter (e.g., F-number and shutter speed), shooting location, and shooting date and time. This allows the user to set a shooting parameter of the digital camera 1 by referring to a displayed shooting parameter, to change a shooting place, or to wait until a desired shooting date and time is reached, and thus the user can shoot an image similar to the reference image R. In the manual mode of the example shown in FIG. 7A, the detailed information output control unit 10*c* displays the detailed information 33 that contains a shooting parameter, and thus an automatic setting of a shooting parameter by the parameter setting unit 10*e* is not performed.

Figure 7B:
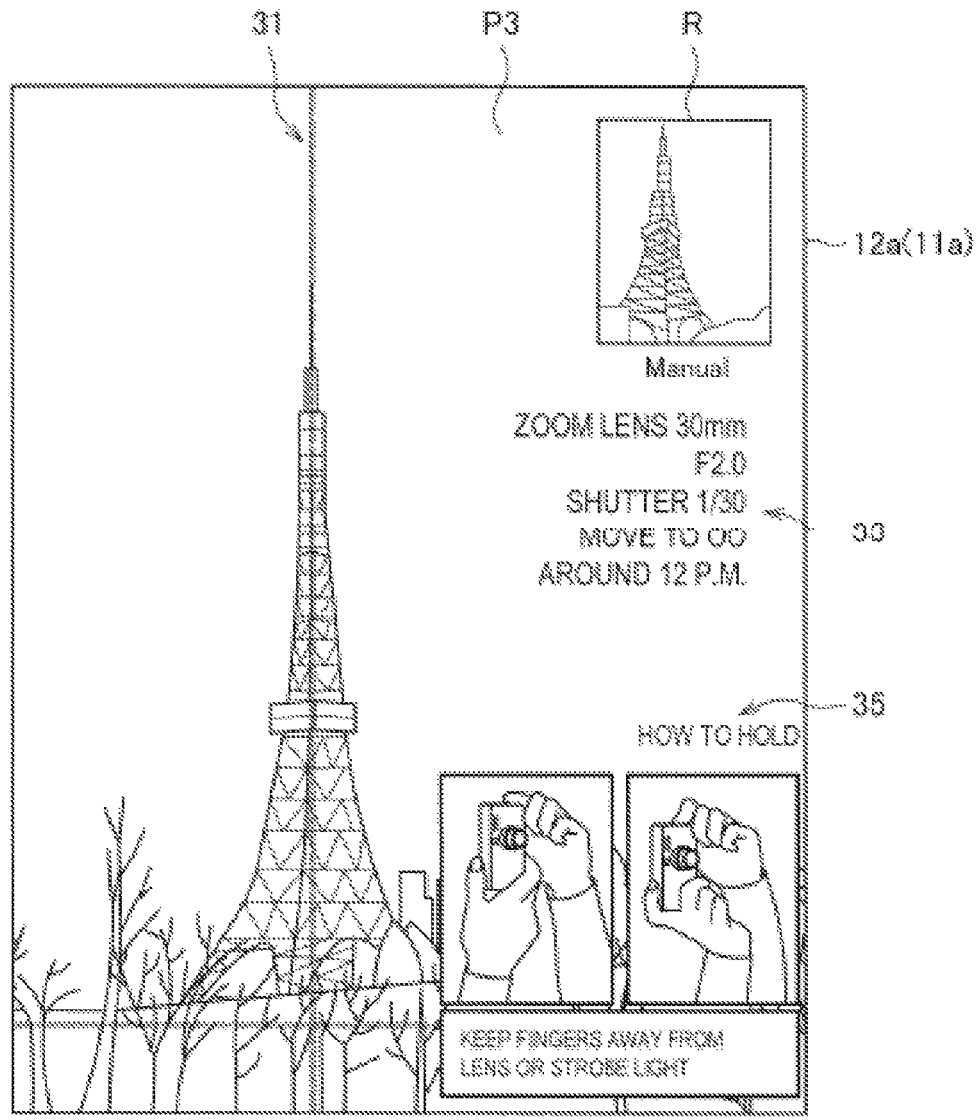
FIG. 7B is a diagram illustrating an example of displaying guide information in manual mode.

The actual shooting guide information display control unit 10*d* may display an indication 35 (an example of shooting guide information) used to describe how to hold (way of holding) the digital camera 1 or considerations, as shown in FIG. 7B.

In this way, it is possible for the user to recognize the contents of the shooting parameter of the reference image R. Thus, the user can set a shooting parameter of the digital camera 1, move the digital camera 1 in accordance with the direction of the reference image R or the auxiliary line 31, or change a location in accordance with the guidance of the shooting location. Accordingly, the user can effectively shoot an image to be photographed. The shooting location or shooting date and time of the reference image R shown in FIG. 7A or 7B may be displayed in the auto mode described above with reference to FIG. 6. The indication 35 used to describe how to hold (way of holding) the digital camera 1 or considerations shown in FIG. 7B may be displayed in the auto mode described above with reference to FIG. 6.

Selection Notification Unit

The selection notification unit 10*f* controls a reference image candidate, which is selected from among the reference image candidates displayed on the display unit 12 by the reference image candidate display control unit 10*b*, to be notified to the server 2 via the communication unit 14. Such a notification allows the server 2 to update a score (the number of reference times) of the reference image, which will be described later.

(Storage Unit)

The storage unit 13 is a storage medium that stores an image obtained through the actual shooting. For example, the storage unit 13 may be implemented by flash memory such as card-type memory. The storage unit 13 includes read-only memory (ROM) on which a program used for the main controller 10 to execute each function described above is stored or random-access memory (RAM) used as a working area when the main controller 10 executes each function described above.

(Communication Unit)

The communication unit 14 transmits and receives data to and from an external device via a wired or wireless connection. Specifically, for example, the communication unit 14 is connected to a network via wireless communication such as wireless LAN and Wi-Fi (registered trademark) or wired communication, and transmits and receives data to and from the sever 2 on the network.

The configuration of the digital camera 1 according to the present embodiment has been described above. The configuration of the sever 2 according to the present embodiment will be described with reference to FIGS. 8 and 9.

<2-2. Configuration of Server>

Figure 8:
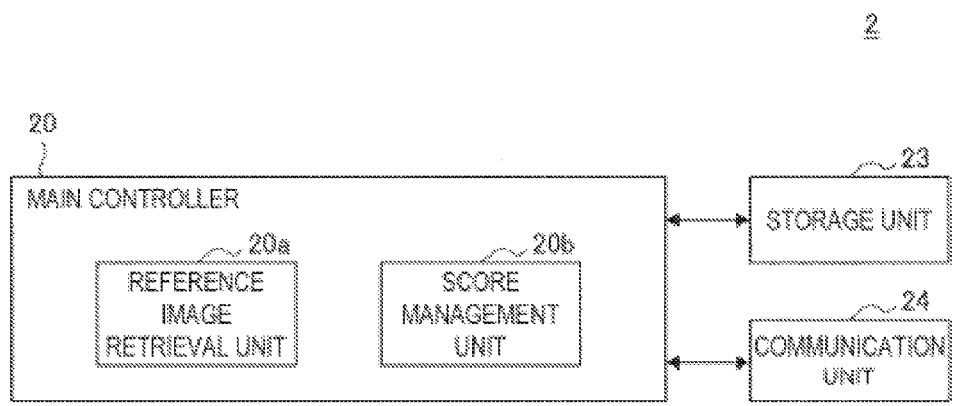
FIG. 8 is a block diagram illustrating a configuration example of a server according to the present embodiment.

FIG. 8 is a block diagram illustrating the configuration of the server 2 according to the present embodiment. As shown in FIG. 8, the server 2 is configured to include a main controller 20, a storage unit 23, and a communication unit 24.

(Main Controller)

The main controller 20 controls components in the server 2. The main controller 20 is implemented, for example, as a microprocessor. The main controller 20 according to the present embodiment functions as a reference image retrieval unit 20*a* and a score management unit 20*b*, as shown in FIG. 8.

Reference Image Retrieval Unit

The reference image retrieval unit 20*a* retrieves other shot images (reference image), which are obtained by photographing a subject or a similar subject included in the preliminary shot image, from the storage unit 23, based on the preliminary shot image and feature quantity data transmitted from the digital camera 1. The reference image retrieval unit 20*a* transmits a list of the retrieved shot images (reference image list) to the digital camera 1. A reference image transmitted to the digital camera 1 contains shooting setting information (shooting parameter), shooting location information, shooting date and time information, ranking information based on a score, model information, which are attached thereto, as detailed information. The reference image retrieval unit 20*a* can retrieves other shot images, which have the composition, angle, and effect similar to those of the preliminary shot image, from the storage unit 23 as a reference image.

Score Management Unit

The score management unit 20*b* updates a score of the shot image (reference image) indicated by the selection notification transmitted from the digital camera 1 depending on the selection notification. The score indicates the number of times that a shot image is selected as a reference image (selected for reference upon the actual shooting) in the digital camera 1. The server 2 receives a selection notification from a plurality of digital cameras 1 and updates a score of each shot image stored in the storage unit 23, thereby ranking shot images (reference image) in the order of popularity among a plurality of users.

(Storage Unit)

The storage unit 23 is a storage medium that stores a shot image. The storage unit 23 includes read-only memory (ROM) on which a program used for the main controller 20 to execute each function described above is stored or random-access memory (RAM) used as a working area when the main controller 20 executes each function described above.

A data configuration example of a shot image stored in the storage unit 23 will be described with reference to FIG. 9. FIG. 9 is a diagram illustrating an example of a data item 231 stored in the storage unit 23. The storage unit 23 stores each shot image (reference image) in association with detailed information, photographic subject information, and score information, as shown in FIG. 9.

The detailed information is metadata of a shot image including shooting parameter, shooting date/time and location information, holding direction (rotation information), thumbnail image, or the like.

The photographic subject information is a name of a photographic subject or feature quantity data of a photographic subject (color or shape of a photographic subject) determined by the main controller 20 based on a result obtained by analyzing a shot image (including feature quantity data). In the example shown in FIG. 9, each shot image is associated with the name of the photographic subject of "Tokyo Tower", as photographic subject information. In this way, each shot image is previously associated with the name of a photographic subject or feature quantity data of a photographic subject, and thus it is possible for the reference image retrieval unit 20*a* to perform retrieval processing more effectively.

The score information indicates the number of times that is selected as an image to be a reference at the time of actual shooting in the digital camera 1 as described above, and the score information is updated by the score management unit 20*b*.

(Communication Unit)

The communication unit 24 transmits and receives data to and from an external device via a wired or wireless connection. Specifically, for example, the communication unit 24 is connected to a network via wired communication, and transmits and receives data to and from the digital camera 1 over the network.

The configuration of the server 2 according to the present embodiment has been described above in detail. The operation process procedure of the shooting support system according to the present embodiment will be described with reference to FIGS. 10 and 11.

3. OPERATION PROCESSING

Figure 10:
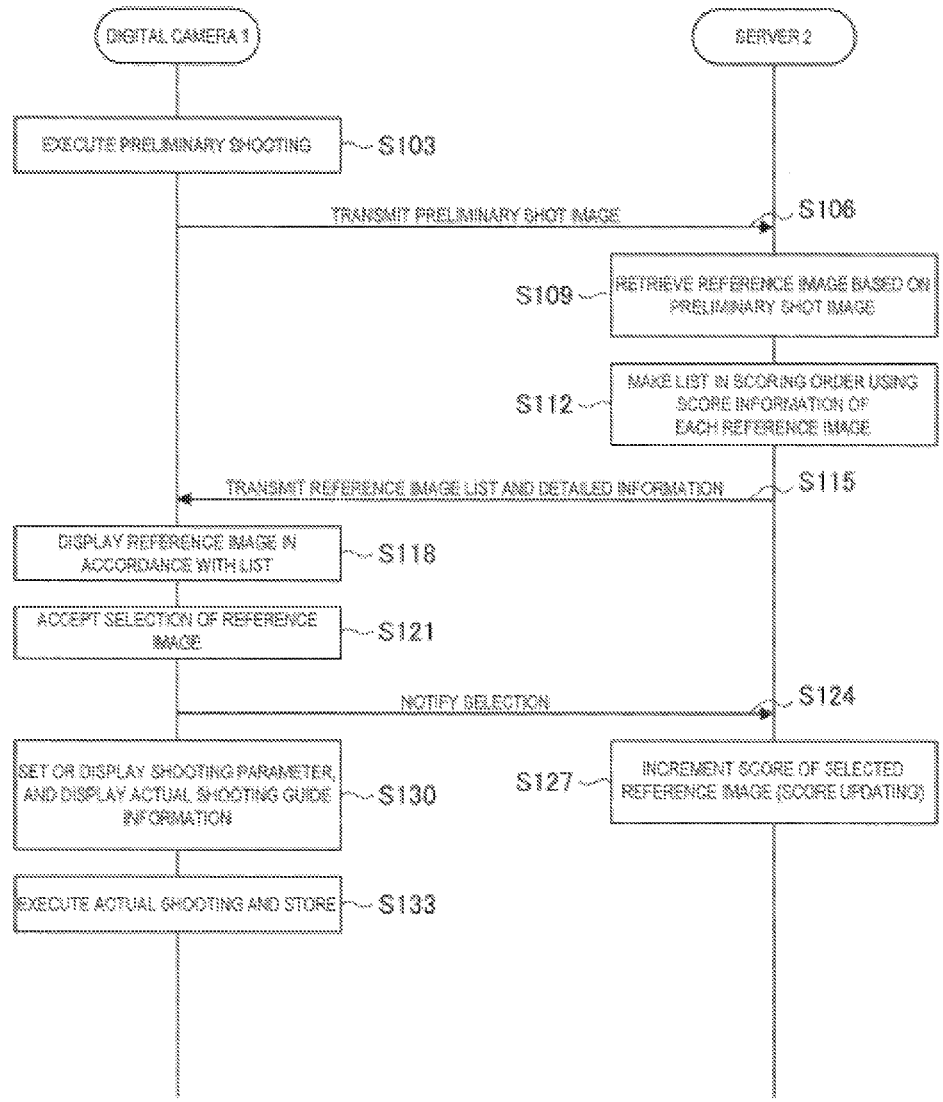
FIG. 10 is a sequence diagram illustrating a shooting support process according to the present embodiment.

FIG. 10 is a sequence diagram illustrating a shooting support process according to the present embodiment. As shown in FIG. 10, in step S103, the preliminary shooting control unit 10*a* of the digital camera 1 executes a preliminary shooting.

In step S106, the digital camera 1 transmits an image obtained through the preliminary shooting to the server 2 via the communication unit 14. In this case, the digital camera 1 may transmit feature quantity data of the preliminary shot image, in addition to the preliminary shot image.

In step S109, the reference image retrieval unit 20*a* of the server 2 retrieves a reference image based on the preliminary shot image transmitted from the digital camera 1. Specifically, the reference image retrieval unit 20*a* retrieves other shot images (reference image), which are obtained by photographing a photographic subject included in the preliminary shot image or a similar photographic subject, from the storage unit 23 based on the preliminary shot image and the feature quantity data.

In step S112, the reference image retrieval unit 20*a* of the server 2 forms a list of reference images in the order of their scores using score information of the respective reference images retrieved from the storage unit 23.

In step S115, the server 2 transmits the reference image list and detailed information attached to the respective reference images to the digital camera 1. In this case, the server 2 may transmit the score information associated with the respective reference images with the score information included in the detailed information.

In step S118, the reference image candidate display control unit 10b of the digital camera 1 controls a reference image candidate to be displayed on the display unit 12a in accordance with the reference image list transmitted from the server 2. Specifically, the reference image candidate display control unit 10b displays a predetermined number of reference image candidates having higher rank in the list on the display unit 12a, or controls the position to be displayed or the size of the displayed image in accordance with the order of rank in the list.

In step S121, the digital camera 1 accepts the user's selection of a reference image among the reference image candidates displayed on the display unit 12a. The selection of a reference image is an operation performed by the user to select an image for reference during actual shooting.

In step S124, the selection notification unit 10f of the digital camera 1 provides a notification indicating that a reference image is selected to the server 2.

In step S127, the score management unit 20b of the server 2 increments the score of the selected image that is stored in the storage unit 23 and updates the scores, based on the selection notification from the digital camera 1.

On the other hand, in step S130, the main controller 10 of the digital camera 1 switches the shooting mode to the actual shooting mode, and performs the setting of a shooting parameter based on the reference image selected by the user and displays the set shooting parameter and actual shooting guide information. Specifically, for example, the detailed information output control unit 10c controls the shooting parameter or information such as the shooting location and date/time information of the reference image R selected by the user to be displayed on a preview screen for the actual shooting. The actual shooting guide information display control unit 10d displays an auxiliary line used to achieve the composition or angle similar to that of the reference image R in the preview screen for actual shooting. The parameter setting unit 10e sets a shooting parameter similar to that of the selected reference image R.

In step S133, the main controller 10 of the digital camera 1 executes the actual shooting, and stores a shot image obtained by the actual shooting in the storage unit 13. The execution of the actual shooting is performed by depressing the shutter button 11b or by detecting a tap operation of the actual shooting button image displayed on the display unit 12a as a trigger.

As described above, the shooting support process according to the present embodiment makes it possible for the user to effectively shoot an image to be photographed using factors such as a composition or an angle, an effect, and camera settings (setting of shooting parameters), similar to those of the reference image selected by the user. In step S115 described above, the server 2 transmits the reference image list to the digital camera 1. However, data to be transmitted to the digital camera 1 by the server 2 is not limited to the reference image list. For example, the server 2 may only transmit a single or a plurality of reference images and the detailed information and score information attached to the reference image. The server 2 may generate a reference image candidate screen based on the retrieved reference image and transmit it to the digital camera 1.

The shooting support process according to the present embodiment is not limited to the process illustrated in FIG. 10. For example, the shooting support process according to the present embodiment may perform a process for re-retrieving a reference image based on the shot image obtained by the actual shooting and presenting the re-retrieved reference image to the user (feedback process), thereby narrowing down the number of reference images. Thus, a reference image matching the user's desire (preference) may be presented to the user.

In other words, when a preliminary shooting is performed only by directing the imaging lens to a photographic subject without consideration of composition or the like, the shot image having various compositions, camera angles, and effects, obtained by shooting the same or similar photographic subject based on the preliminary shot image is presented as a reference image. Then, when the actual shooting is performed after the composition or shooting position is adjusted based on the reference image, the shot image having the same or similar composition, angle, and effect, obtained by shooting the same or similar photographic subject based on the actual shot image is presented as a reference image. The actual shooting and the presentation of the reference image retrieved based on the actual shooting can be repeatedly performed, and thus the number of reference images is narrowed down, thereby presenting a shot image having higher technology as a candidate. A re-retrieval process based on the actual shooting as described above will be described in detail with reference to FIG. 11.

Figure 11:
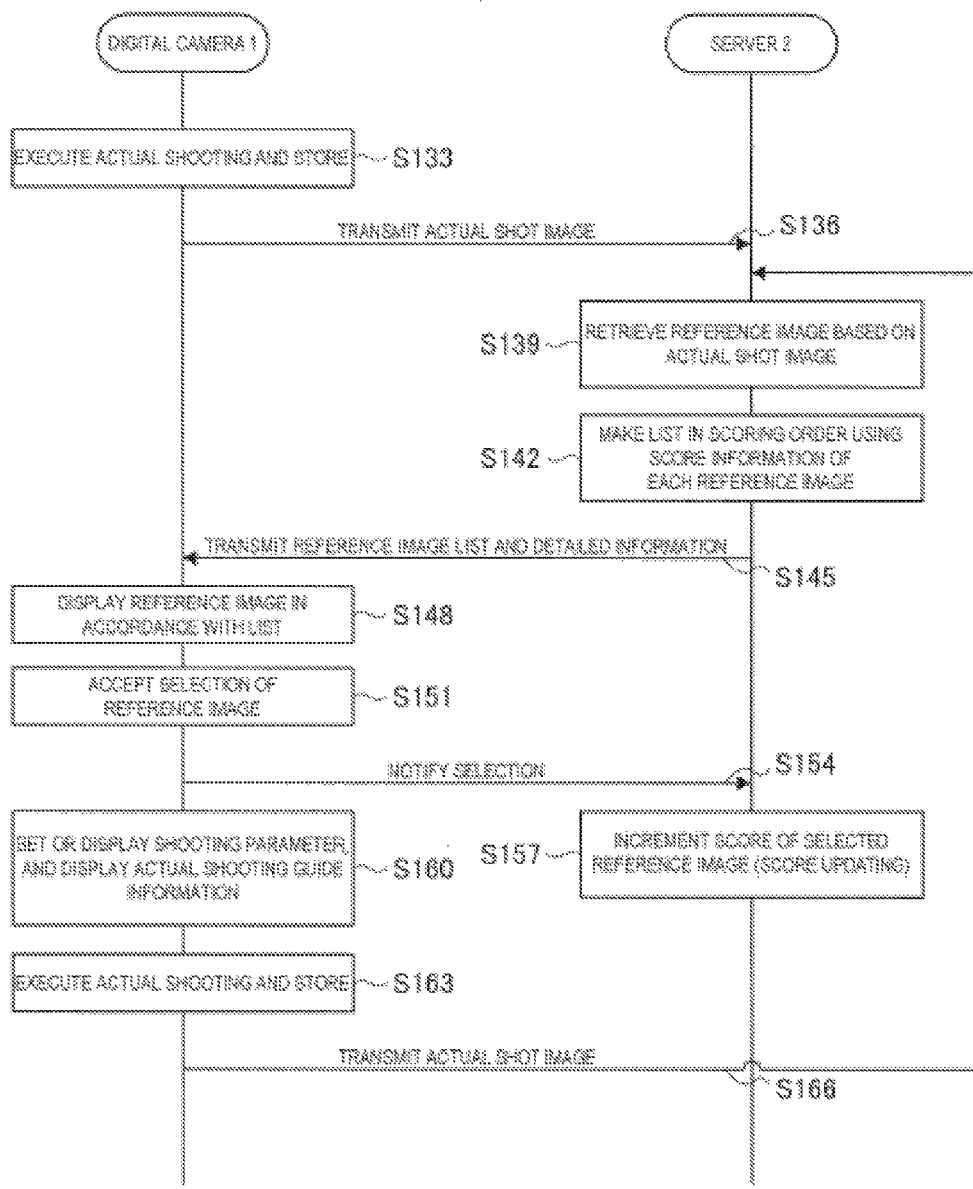
FIG. 11 is a sequence diagram illustrating a re-retrieval process of a reference image based on an actual shot image.

FIG. 11 is a sequence diagram illustrating a process for re-retrieving a reference image based on the actual shot image. As shown in FIG. 11, in step S133, the main controller 10 of the digital camera 1 performs the actual shooting and stores a shot image obtained by the actual shooting in the storage unit 13 (a process similar to the same step shown in FIG. 10).

In step S136, the digital camera 1 transmits the actual shot image to the server 2. In this case, the digital camera 1 may transmit feature quantity data of the actual shot image together with the actual shot image.

In step S139, the reference image retrieval unit 20a of the server 2 retrieves a reference image based on the actual shot image transmitted from the digital camera 1. Specifically, the reference image retrieval unit 20a retrieves other shot images (reference image) from the storage unit 23 based on the actual shot image and the feature quantity data. The other shot images are obtained by photographing a photographic subject that is the same or similar to a photographic subject included in the image obtained by the actual shooting with the same or similar composition, camera angle, and effect to those of the image obtained by the actual shooting.

In step S142, the reference image retrieval unit 20a of the server 2 forms a list of reference images in the order of their scores using score information of the respective reference images retrieved from the storage unit 23.

In step S145, the server 2 transmits the reference image list and detailed information attached to the respective reference images to the digital camera 1.

In step S148, the reference image candidate display control unit 10b of the digital camera 1 controls a reference image candidate to be displayed on the display unit 12a in accordance with the reference image list transmitted from the server 2.

In step S151, the digital camera 1 accepts the selection of a reference image by the user among the reference image candidates displayed on the display unit 12a.

In step S154, the selection notification unit 10f of the digital camera 1 provides a notification indicating that a reference image is selected to the server 2.

In step S157, the score management unit 20b of the server 2 increments the score of the selected reference image stored in the storage unit 23 and updates the scores, based on the selection notification from the digital camera 1.

On the other hand, in step S160, the main controller 10 of the digital camera 1 performs the setting of a shooting parameter based on the reference image selected by the user and displays the set shooting parameter and actual shooting guide information. Specifically, for example, the detailed information output control unit 10c controls the shooting parameter or information such as the shooting location and date/time information of the reference image R selected by the user to be displayed on a preview screen for the actual shooting. The actual shooting guide information display control unit 10d displays an auxiliary line used to achieve composition or angle similar to that of the reference image R in the preview screen for the actual shooting. The parameter setting unit 10e sets a shooting parameter similar to that of the selected reference image R.

In step S163, the main controller 10 of the digital camera 1 executes the actual shooting, and stores a shot image obtained through the actual shooting in the storage unit 13.

In step S166, the digital camera 1 transmits the image obtained through the actual shooting to the server 2, and then steps S139 to S166 are repeated.

As described above, the shooting support process according to the present embodiment makes it possible to narrow down the number of reference images to be presented to the user by performing repeatedly the actual shooting and the re-retrieval of reference images based on the actual shooting. This allows the user to select a new composition, effect, camera angle, camera settings (shooting parameter), or the like every time the actual shooting is performed, thereby ensuring a continuation of interactive shooting.

4. OTHER EMBODIMENTS

The embodiment described above with reference to FIGS. 1 to 11 is directed to the shooting support system configured to include the digital camera 1 (client terminal) and the server 2. However, main functions of the shooting support system according to the present embodiment may be executed only by the digital camera 1. A shooting support system including the digital camera 1 alone will be described in detail with reference to FIGS. 12 and 13.

<4-1. Configuration of Digital Camera>

Figure 12:
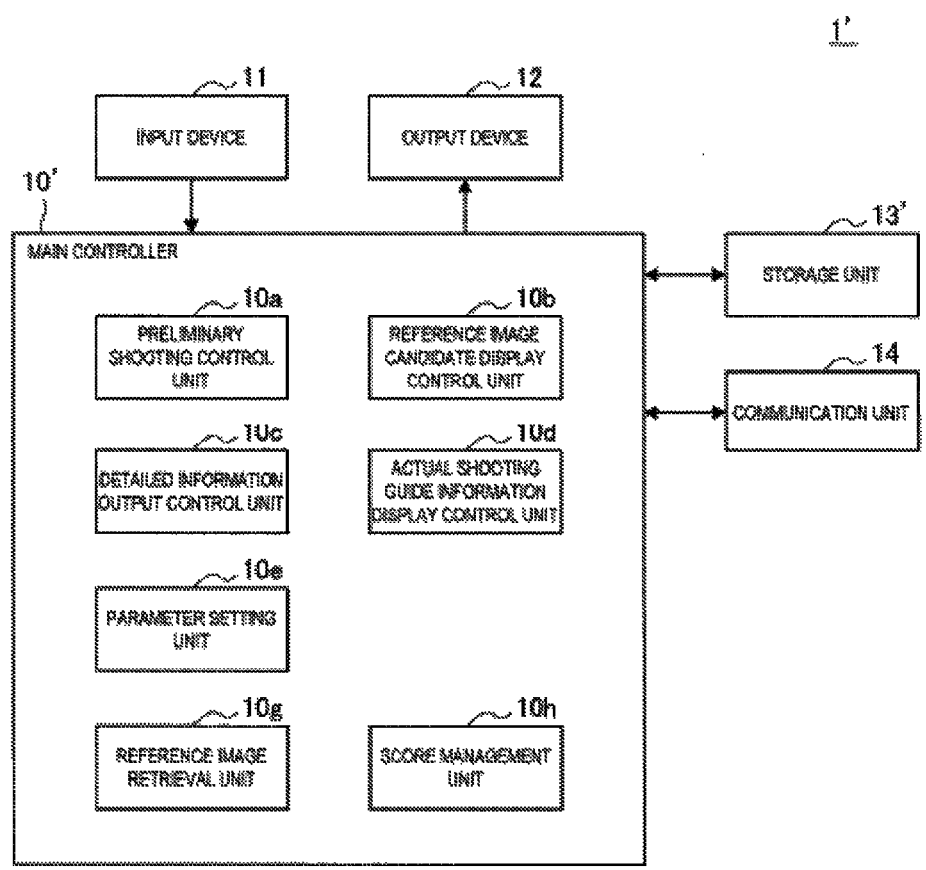
FIG. 12 is a block diagram illustrating an internal configuration example of a digital camera according to another embodiment of the present disclosure.

FIG. 12 is a block diagram illustrating an internal configuration example of a digital camera 1' according to another embodiment of the present disclosure. As shown in FIG. 12, the digital camera 1' according to the present embodiment is configured to include a main controller 10', an input device 11, an output device 12, a storage unit 13', and a communication unit 14. The input device 11, the output device 12, and the communication unit 14 are similar to the respective components described above with reference to FIG. 2, and thus the description thereof will be omitted.

(Main Controller)

The main controller 10' controls components in the digital camera 1'. The main controller 10' is implemented, for example, as a microprocessor. The main controller 10' according to the present embodiment functions as a preliminary shooting control unit 10a, a reference image candidate display control unit 10b, a detailed information output control unit 10c, an actual shooting guide information display control unit 10d, a parameter setting unit 10e, a reference image retrieval unit 10g, and a score management unit 10h, as shown in FIG. 12. The preliminary shooting control unit 10a, the reference image candidate display control unit 10b, the detailed information output control unit 10c, the actual shooting guide information display control unit 10d, the parameter setting unit 10e are similar to the respective components described above with reference to FIG. 2, and thus the description thereof will be omitted.

Reference Image Retrieval Unit

The reference image retrieval unit 10g retrieves a reference image based on a preliminary shot image photographed by the preliminary shooting control unit 10a. A specific method of retrieval is similar to that performed by the reference image retrieval unit 20a described above with reference to FIG. 8, and thus the description thereof will be omitted. The reference image retrieval unit 10g supplies the retrieved reference image candidate (or a reference image list made in the order of score) to the reference image candidate display control unit 10b.

Score Management Unit

The score management unit 10h updates a score (the score indicating the number of reference times) stored in the storage unit 13' so that the score is associated with a reference image selected for the user's reference during the actual shooting from among reference image candidates displayed on the display unit 12a by the reference image candidate display control unit 10b.

(Storage Unit)

The storage unit 13' is a storage medium that stores a shot image. The storage unit 13' includes read-only memory (ROM) on which a program used for the main controller 20 to execute each function described above is stored or random-access memory (RAM) used as a working area when the main controller 20 executes each function described above.

The storage unit 13' according to the present embodiment stores a shot image obtained by actual shooting in the digital camera 1' or a shot image that is captured by other user and is obtained from the outside via the communication unit 14. The storage unit 13' stores each shot image (reference image) in association with detailed information, photographic subject information, and score information, as is the case with the storage unit 23 described above with reference to FIG. 8.

The configuration described above allows the digital camera 1' according to the present embodiment to retrieve a reference image from the built-in storage unit 13' based on the preliminary shot image obtained through the preliminary shooting in the digital camera 1, and allows the digital camera 1' to display a reference image candidate on the display unit 12a. The reference image retrieval unit 10g of the digital camera 1' may retrieve a reference image from an external storage device connected via the communication unit 14, in addition to the built-in storage unit 13'.

<4-2. Operation Process>

The operation process procedure according to the present embodiment will be described with reference to FIG. 13. FIG. 13 is a flowchart illustrating a shooting support process according to another embodiment of the present disclosure.

As shown in FIG. 13, in step S203, the preliminary shooting control unit 10a of the digital camera 1' executes a preliminary shooting.

In step S206, the reference image retrieval unit 10g of the digital camera 1' retrieves a reference image based on the preliminary shot image. Specifically, the reference image retrieval unit 10g retrieves other shot images (reference image), which are obtained by photographing a photographic subject that is the same or similar to a photographic subject included in the preliminary shot image, from the storage unit 13' based on the preliminary shot image and the feature quantity data detected from the preliminary shot image.

In step S209, the reference image retrieval unit 10g forms a list of reference images in the order of their scores using score information of the respective reference images retrieved from the storage unit 13'.

In step S212, the reference image candidate display control unit 10b of the digital camera 1' controls a reference image candidate to be displayed on the display unit 12a in accordance with the reference image list supplied from the reference image retrieval unit 20g.

In step S215, the digital camera 1' accepts the user's selection of a reference image among the reference image candidates displayed on the display unit 12a.

In step S218, the score management unit 10h of the digital camera 1' increments the score of the selected reference image stored in the storage unit 13' and updates the scores, depending on acceptance of the selection of reference image.

In step S221, the main controller 10' of the digital camera 1' switches the shooting mode to the actual shooting mode, and then performs the setting of a shooting parameter based on the reference image selected by the user and displays the set shooting parameter and actual shooting guide information.

In step S224, the main controller 10' of the digital camera 1' executes the actual shooting, and stores a shot image obtained by the actual shooting in the storage unit 13'.

As described above, the digital camera 1' according to another embodiment of the present disclosure allows a reference image to be retrieved based on a preliminary shot image and allows a reference image candidate to be displayed on the display unit 12a.

5. CONCLUSION

As described above, the shooting support system according to the present embodiment displays a reference image obtained by retrieval based on the preliminary shooting, and displays detailed information of the selected reference image or sets automatically a shooting parameter included in the detailed information, thereby supporting the user to perform the actual shooting.

Although the preferred embodiments of the present disclosure have been described in detail with reference to the appended drawings, the present disclosure is not limited thereto. A person skilled in the art may find various alterations and modifications within the scope of the appended claims, and it should be understood that they will naturally come under the technical scope of the present disclosure.

For example, a computer program, which is used to cause hardware such as CPU, ROM, and RAM included in the digital camera 1 (or digital camera 1') or the server 2 to execute functions of the digital camera 1 (or digital camera 1') or the server 2 described above, can be created. There is provided a computer-readable storage medium having the computer program stored thereon.

The steps in the processing procedure performed by the digital camera 1 (or digital camera 1') or the server 2 herein may be not necessarily processed in time series according to the order described in the accompanying flowcharts and sequence diagrams. For example, the steps in the processing procedure performed by the digital camera 1 (or digital camera 1') or the server 2 may be processed in a different order from that described in the sequence diagram or the flowchart, or may be performed in a parallel manner. Specifically, in FIG. 10, steps S124 to S127 and S130 to S133 may be processed in reverse order or may be processed in parallel.

The method of selecting a reference image from reference image candidates displayed on the display unit 12a may include automatically selecting a reference image in the order of ranking (the order of list) in addition to the manual selection by the user as described above. In other words, the main controller 10 of the digital camera 1 switches the shooting mode to the actual shooting mode, for example, without presentation of a reference image after the preliminary shooting. The parameter setting unit 10e controls a shooting parameter to be set to be similar to a reference image selected in a random way or automatically in the order of lists from among reference image candidates when actual shooting is performed by pressing the shutter button 11b. In this way, the digital camera 1 according to the embodiment allows a reference image to be automatically selected from reference image candidates without the manual selection (selection operation) by the user, and allows a shooting parameter of the reference image to be set during actual shooting. This makes it possible for the user to shoot an image with different settings (shooting parameters) each time the shutter button 11b is pressed.

The detailed information output control unit 10c allows the detailed information to be output from an external display device or external audio output device in addition to from the display unit 12a or an audio output unit (loudspeaker) provided in the digital camera 1 (client terminal). For example, when the client terminal according to the present disclosure does not include an output device such as a display unit or audio output unit, the detailed information output control unit 10c allows the detailed information to be output from a handheld mobile terminal (e.g., smartphones and tablets). The case where the client terminal does not include an output device is, for example, when the client terminal is a head-mounted display or eyeglass-type wearable device provided with an action camera or built-in camera.

A method of using a score (a score indicating the number of reference times) that is associated with a reference image may be used to recognize the user preference trends and to collect statistics of popular shooting spot, popular shooting time zone, or popular camera settings (popular shooting parameter setting), in addition to the forming a list of reference images as described above.

Additionally, the present technology may also be configured as below.

(1) A client terminal including:
a candidate display control unit configured to control a candidate for a reference captured image to be displayed on a display unit, the reference captured image being retrieved based on a preliminary captured image obtained by preliminary image capture in an imaging unit and being referred to during actual image capture; and
a detailed information output control unit configured to control detailed information to be output, the detailed information being attached to a reference captured image selected from among the displayed candidates for the reference captured image.

(2) The client terminal according to (1),
wherein the detailed information output control unit controls the detailed information to be displayed on the display unit or to be output from an audio output unit.

(3) The client terminal according to (1) or (2),
wherein the candidate display control unit controls the candidate for the reference captured image to be displayed on a map image in a manner that the candidate for the reference captured image is associated with an image capturing position of each of the reference captured images.

(4) The client terminal according to (1) or (2),
wherein the candidate display control unit controls the candidate for the reference captured image to be displayed on a screen of the display unit on a grip side of the client terminal.

(5) The client terminal according to any one of (1) to (4),
wherein the detailed information output control unit controls the detailed information to be displayed on a screen on which the candidate for the reference captured image is displayed.

(6) The client terminal according to any one of (1) to (4),
wherein the detailed information output control unit controls the detailed information to be displayed on a preview screen for actual image capture that is switched in response to selection of the reference captured image.

(7) The client terminal according to any one of (1) to (6),
wherein the detailed information includes at least any one of an image capturing parameter, image capturing position information, and image capturing date and time information.

(8) The client terminal according to any one of (1) to (7), further including:
a parameter setting unit configured to set, in case of being switched to an actual image capturing mode in response to selection of the reference captured image, an image capturing parameter included in the detailed information attached to the selected reference captured image.

(9) The client terminal according to any one of (1) to (8), further including:
a guide information display control unit configured to control, in case of being switched to an actual image capturing mode in response to selection of the reference captured image, actual image capturing guide information corresponding to the selected reference captured image to be displayed on a preview screen for actual image capture.

(10) The client terminal according to (9),
wherein the actual image capturing guide information includes at least any one of guide information used to set a composition or an angle similar to a composition or an angle of the selected reference captured image, and guide information on how to hold the client terminal.

(11) The client terminal according to any one of (1) to (10),
wherein the candidate display control unit controls a position and/or a size of each reference captured image to be displayed depending on score information attached to the candidate for each reference captured image.

(12) The client terminal according to any one of (1) to (11),
wherein the reference captured image is a photographic subject that is identical or similar to a photographic subject included in the preliminary captured image obtained by preliminary image capture, or is a captured image with a composition, an angle, and an effect that are identical or similar to a composition, an angle, and an effect of the preliminary captured image.

(13) The client terminal according to any one of (1) to (12),
wherein the candidate display control unit controls a candidate for a reference captured image to be displayed on the display unit, the reference captured image being re-retrieved based on an actual captured image obtained by actual image capture.

(14) The client terminal according to any one of (1) to (13), further including:
a receiver configured to receive the candidate for the reference captured image from a server.

(15) The client terminal according to any one of (1) to (14), further including:
a storage unit configured to store the reference captured image; and
a retrieval unit configured to retrieve a candidate for a reference captured image from the storage unit based on the preliminary captured image obtained by preliminary image capture.

(16) A display control method including:
a step of controlling a candidate for a reference captured image to be displayed on a display unit, the reference captured image being retrieved based on a preliminary captured image obtained by preliminary image capture in an imaging unit and being referred to during actual image capture; and
a step of controlling detailed information to be output, the detailed information being attached to a reference captured image selected from among the displayed candidates for the reference captured image.

(17) A program for causing a computer to execute:
processing of controlling a candidate for a reference captured image to be displayed on a display unit, the reference captured image being retrieved based on a preliminary captured image obtained by preliminary image capture in an imaging unit and being referred to during actual image capture; and
processing of controlling detailed information to be output, the detailed information being attached to a reference captured image selected from among the displayed candidates for the reference captured image.

(18) A system including:
a client terminal including
a transmitter configured to transmit a preliminary captured image obtained by preliminary image capture to a server,
a receiver configured to receives a candidate for a reference captured image from the server, the reference captured image being retrieved based on the preliminary captured image obtained by preliminary image capture,
a candidate display control unit configured to control the candidate for the reference captured image received by the receiver to be displayed on a display unit, and
a detailed information output control unit configured to control detailed information to be output, the detailed information being attached to a reference captured image selected from among the displayed candidates for the reference captured image; and
a server including
a storage unit configured to store the reference captured image,
a retrieval unit configured to retrieve a candidate for a reference captured image from the storage unit based on the preliminary captured image transmitted from the client terminal, and
a transmitter configured to transmit a candidate for a reference captured image retrieved by the retrieval unit to the client terminal.

REFERENCE SIGNS LIST 1, 1' digital camera
10, 10' main controller
10a preliminary shooting control unit
10b reference image candidate display control unit
10c detailed information output control unit
10d actual shooting guide information display control unit 10e parameter setting unit
10g reference image retrieval unit
10h score management unit
11 input device
11a touch sensor
11b shutter button
11c zoom lever
11d various operation buttons
12 output device
12a display unit
13, 13' storage unit
14 communication unit
2 server
20 main controller
20a reference image retrieval unit
20b score management unit
23 storage unit
24 communication unit
30 indication of "other"
31 auxiliary line
33 detailed information
C1 to C4 reference image candidate
P1 through-the-lens image (preliminary shot image)
P3 actual shooting preview screen (through-the-lens image)
R reference image

What is claimed is:

1. A client terminal, comprising:
an imaging unit;
a display unit; and
at least one processor configured to:
control the imaging unit to acquire an image that includes a first photographic subject;
control the display unit to display at least one thumbnail image of a plurality of thumbnail images associated with the acquired image,
wherein the at least one thumbnail image is displayed based on a feature quantity of the acquired image such that the at least one thumbnail image is overlaid on a map image to indicate a shooting location of the at least one thumbnail image,
wherein the map image is displayed on the display unit; and
control the display unit to attach detailed information to the at least one thumbnail image.

2. The client terminal according to claim 1, wherein the at least one processor is further configured to control the display unit to arrange the plurality of thumbnail images from a corner region of a screen of the display unit toward a center region of the screen, wherein the corner region is adjacent to a grip side of the client terminal.

3. The client terminal according to claim 2, wherein the at least one processor is further configured to arrange the plurality of thumbnail images based on score information of each of the plurality of thumbnail images.

4. The client terminal according to claim 1, wherein the at least one processor is further configured to control the display unit to display the detailed information on a preview screen, wherein the preview screen is switched based on a user selection that selects at least one thumbnail image from the plurality of thumbnail images.

5. The client terminal according to claim 4, wherein the at least one processor is further configured to set, based on the user selection of the at least one thumbnail image, an image capturing parameter included in the detailed information attached to the at least one thumbnail image.

6. The client terminal according to claim 4, wherein the at least one processor is further configured to control the display unit to display a guide image based on the selection of the at least one thumbnail image and based on rotation information, wherein the rotation information indicates a movement to the shooting location corresponding to the at least one thumbnail image.

7. The client terminal according to claim 4, wherein the at least one processor is further configured to control the display unit, based on the selection of the at least one thumbnail image, to display cross lines to indicate a composition of the selected at least one thumbnail image.

8. The client terminal according to claim 1, wherein the detailed information includes at least one of an image capturing parameter, image capturing position information, image capturing date information, or image capturing time information.

9. The client terminal according to claim 1, wherein the at least one thumbnail image includes a second photographic subject that is identical or substantially identical to the first photographic subject.

10. The client terminal according to claim 1, further comprising
a receiver configured to receive the at least one thumbnail image from a server.

11. The client terminal according to claim 1, further comprising
a storage unit configured to store the at least one thumbnail image.

12. A method, comprising:
in an apparatus including a display unit, an imaging unit, and at least one processor;
controlling the imaging unit to acquire an image including a photographic subject;
controlling the display unit to display at least one thumbnail image associated with the acquired image,
wherein the at least one thumbnail image is displayed based on a feature quantity of the acquired image such that the at least one thumbnail image is overlaid on a map image to indicate a shooting location of the at least one thumbnail image,
wherein the map image is displayed on the display unit; and
controlling the display unit to attach detailed information to the at least one thumbnail image.

13. A non-transitory computer-readable medium having stored thereon, computer-executable instructions which, when executed by at least one processor of an apparatus, causes the at least one processor to execute operations, the operations comprising:
controlling an imaging unit of the apparatus to acquire an image including a photographic subject;
controlling a display unit of the apparatus to display at least one thumbnail image associated with the acquired image,
wherein the at least one thumbnail image is displayed based on a feature quantity of the acquired image such that the at least one thumbnail image is overlaid on a map image to indicate a shooting location of the at least one thumbnail image,
wherein the map image is displayed on the display unit; and
controlling the display unit to attach detailed information to the at least one thumbnail image.

14. A system, comprising:
a client terminal including:
an imaging unit configured to acquire an image that includes a photographic subject;

a first transmitter configured to transmit the acquired image to a server;
a receiver configured to receive at least one thumbnail image associated with the acquired image from the server, wherein the at least one thumbnail image is retrieved based on a feature quantity of the acquired image;
a display unit configured to display a map image; and
at least one processor configured to:
   control the display unit to display the at least one thumbnail image, wherein the at least one thumbnail image is overlaid on the map image to indicate a shooting location of the at least one thumbnail image; and
   control the display unit to attach detailed information to the at least one thumbnail image; and
the server including:
   a storage unit configured to store the at least one thumbnail image; and
   a second transmitter configured to transmit the at least one thumbnail image to the client terminal.

* * * * *